(12) United States Patent
Lee

(10) Patent No.: US 10,315,468 B2
(45) Date of Patent: Jun. 11, 2019

(54) RESONANCE NOISE REDUCTION TIRE HAVING SOUND ABSORBING MATERIAL MOUNTED THEREIN

(71) Applicant: KUMHO TIRE CO., INC., Gwangju (KR)

(72) Inventor: Jongsik Lee, Yongin-si (KR)

(73) Assignee: KUMHO TIRE CO., INC., Gwangju (KR)

( * ) Notice: Subject to any disclaimer, the term of this patent is extended or adjusted under 35 U.S.C. 154(b) by 191 days.

(21) Appl. No.: 15/346,975

(22) Filed: Nov. 9, 2016

(65) Prior Publication Data

US 2017/0341474 A1    Nov. 30, 2017

(30) Foreign Application Priority Data

May 27, 2016    (KR) ......................... 10-2016-0065644

(51) Int. Cl.
*B60C 19/00*    (2006.01)
*B60C 5/00*    (2006.01)

(52) U.S. Cl.
CPC .................................. *B60C 19/002* (2013.01)

(58) Field of Classification Search
CPC .................................................... B60C 19/002
See application file for complete search history.

(56) References Cited

U.S. PATENT DOCUMENTS

| | | | | |
|---|---|---|---|---|
| 7,182,114 B2 * | 2/2007 | Yukawa | ................ | B60C 19/002 152/450 |
| 7,681,613 B2 * | 3/2010 | Yukawa | ................ | B60C 19/002 152/450 |
| 7,743,808 B2 * | 6/2010 | Yukawa | ................ | B60C 19/002 152/450 |
| 7,975,740 B2 * | 7/2011 | Yukawa | ................ | B60C 19/002 152/450 X |
| 8,794,281 B2 * | 8/2014 | Yukawa | ................ | B60C 19/002 152/450 |

FOREIGN PATENT DOCUMENTS

KR    10-1016264 B1    2/2011

* cited by examiner

*Primary Examiner* — Adrienne C. Johnstone
(74) *Attorney, Agent, or Firm* — Baker & Hostetler LLP

(57) ABSTRACT

The present invention provides a resonance noise reduction tire having a sound absorbing material mounted therein. The resonance noise reduction tire has a sound absorbing material which is mounted therein so as to be adhered to an inner liner formed inside the tire in a circumferential direction thereof. The sound absorbing material is adhered to the inner liner in the circumferential direction thereof, and is configured so that opposite ends thereof are adhered with being separated at a predetermined interval so as not to be abutted to each other.

2 Claims, 3 Drawing Sheets

RESONANCE NOISE REDUCTION TIRE HAVING SOUND ABSORBING MATERIAL MOUNTED THEREIN

CROSS REFERENCE TO RELATED APPLICATIONS

This application claims priority to Korean Patent Application No. 10-2016-0065644, filed on May 27, 2016 in the Korean Intellectual Property Office, the entire disclosure of which is incorporated herein by reference.

BACKGROUND OF THE INVENTION

Field of the Invention

The present invention relates to a resonance noise reduction tire having a sound absorbing material mounted therein, and more specifically, to a resonance noise reduction tire having a sound absorbing material mounted therein, in which, in order to reduce vibration etc., occurred during rotating the tire by improving an adhesion structure of the sound absorbing material to be mounted in the tire, a length of the sound absorbing material may be optimized so as to prevent opposite ends of the sound absorbing material adhered to an inner liner of the tire from being detached, such that adhesive properties of the sound absorbing material may be secured, and the resonance noise of the tire may be reduced.

Description of the Related Art

When tread patterns of a pneumatic tire contact with an irregular road surface or receive a shock applied from an outside during driving a vehicle, noise occurs. If the noise occurred as described above is transmitted into the tire filled with air, the inner air is vibrated by the tire itself due to the transmitted noise, whereby the tire acts as a resonance barrel for amplifying a sound so as to amplify the noise.

In addition, due to a resonance phenomenon caused by a frequency of the noise amplified by the tire as described above and a frequency according to a shape of a material included in the tire, for example, a cross section structure formed in a U shape so as to allow the air to be filled into the tire, the noise of the tire is further amplified.

To solve the above-described problems, low-noise tires having a sound absorbing material mounted in the tire have been developed.

Most of the conventional sound absorbing materials mounted in the tire are configured to be adhered to the inside the tire, that is, to an inner liner of the tire using a double-sided tape. The sound absorbing material mounted on the inner liner is adhered so that the opposite ends thereof are abutted to each other.

However, a phenomenon, in which the sound absorbing material mounted in the tire is damaged or detached therefrom due to various driving conditions, occurs. In particular, when the sound absorbing material is adhered in a state that the opposite ends thereof are abutted to each other, a phenomenon, in which a stress is concentrated at the opposite ends of the sound absorbing material, occurs. If the stress is excessively concentrated at the opposite ends of the sound absorbing material, an adhesive force at the opposite ends of the sound absorbing material may be deteriorated, thereby causing a problem of detaching from the inner liner.

Due to the above-described problems, if the opposite ends of the sound absorbing material are detached from the inner liner, a resonance noise generated in the tire may not be reduced, and a failure in uniformity of the tire may also occur.

In order to solve the above-described problems, Korean Patent Registration No. 10-1016264 (published on Feb. 25, 2011) discloses an invention relating to a noise absorber for reducing a resonance noise of a tire and a method thereof. However, the above invention still has lack of prevention an occurrence of the resonance noise.

SUMMARY OF THE INVENTION

In consideration of the above-mentioned circumstances, it is an object of the present invention to provide a resonance noise reduction tire having a sound absorbing material mounted therein which includes a means for adhering opposite ends of the sound absorbing material mounted in the tire so as not to be abutted to each other, such that a phenomenon in which a stress is concentrated at the opposite ends of the sound absorbing material may be prevented to increase the adhesive force of the opposite ends of the sound absorbing material, wherein the sound absorbing material has an optimized length so as not to influence an uniformity performance of the tire, thus the resonance noise of the tire may be reduced.

In order to accomplish the above objects, there is provided a resonance noise reduction tire having a sound absorbing material which is mounted therein using an adhesive so as to be adhered to an inner liner formed inside the tire in a circumferential direction thereof, wherein the sound absorbing material is adhered to the inner liner in the circumferential direction thereof, and the sound absorbing material is configured so that opposite ends thereof are adhered with being separated at a predetermined interval so as not to be abutted to each other.

In addition, the opposite ends of the sound absorbing material may be formed so that a separated interval of an adhered end side which is formed on an outer side in the radial direction of the tire with being adhered to the inner liner is larger than a separated interval of a free end side which is formed on an inner side in a radial direction of the tire.

Further, the sound absorbing material may be formed so that the opposite ends thereof on the free end side are separated at an interval of 10 to 30 mm, and the opposite ends thereof on the adhered end side are separated at an interval of 20 to 50 mm.

Further, the opposite ends of the sound absorbing material may have inclined faces formed in an inversed V shape so that an interval therebetween is gradually increased from the free end side formed at the narrow separated interval toward the adhered end side formed at the wide separated interval.

According to the present invention, since the sound absorbing material mounted in the tire is disposed in such a manner that the opposite ends thereof are separated at a predetermined interval so as not to be abutted to each other, if a shock is applied to the sound absorbing material due to various driving conditions, the opposite ends of the sound absorbing material do not collide with each other. Therefore, an adhesive force at the opposite ends of the sound absorbing material may be maintained at the same adhesive force as an initial adhered state thereof. In addition, since the sound absorbing material is maintained in a state of being initially adhered to the inner liner of the tire as it is, effects of reducing the resonance noise to a level set at the time of manufacturing the tire may be obtained. Further, since the opposite ends of the sound absorbing material are maintained in the initially adhered state, an occurrence of uniformity failure in the tire may be prevented.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a specific embodiment of a resonance noise reduction tire having a sound absorbing material mounted therein according to the present invention will be described in detail with reference to the accompanying drawings.

Figure 1:
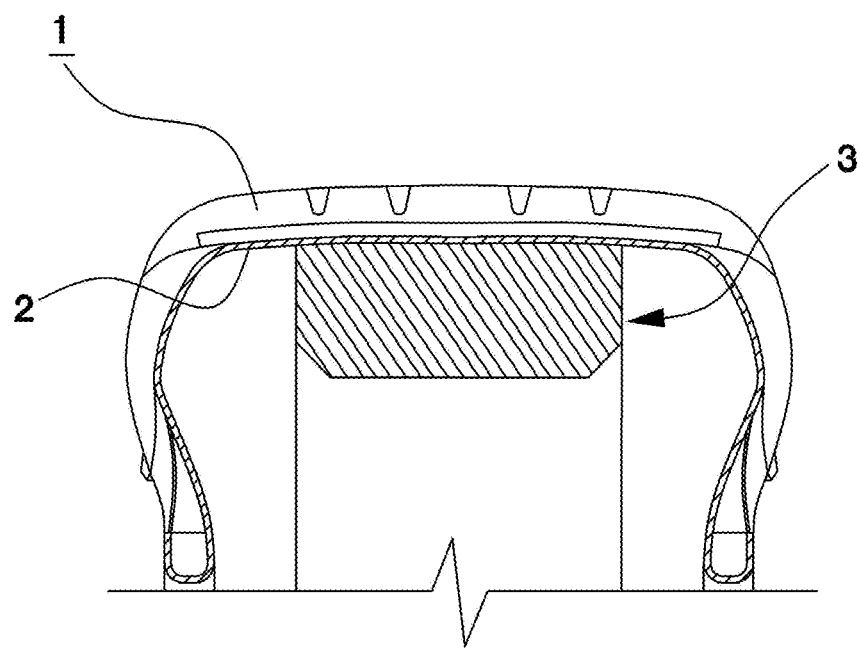
FIG. 1 is a traverse sectional view of a tire illustrating a state in which a sound absorbing material is mounted in a resonance noise reduction tire of the present invention.

Referring to FIG. 1, a pneumatic tire 1 includes an inner liner 2 formed inside the tire 1, and a sound absorbing material 3 mounted on the inner liner 2 in a circumferential direction of the tire 1. The sound absorbing material 3 is mounted in a structure of being adhered to the inner liner 2 by an adhesive, a double-sided tape or the like.

In addition, when a noise occurred at the time of tread patterns of the tire 1 contact with a road surface or a shock is applied to the tread patterns is transmitted into the tire 1 filled with air, in order to reduce the noise, the sound absorbing material 3 is made of a porous material, etc. capable of efficiently absorb the transmitted noise.

Figure 2:
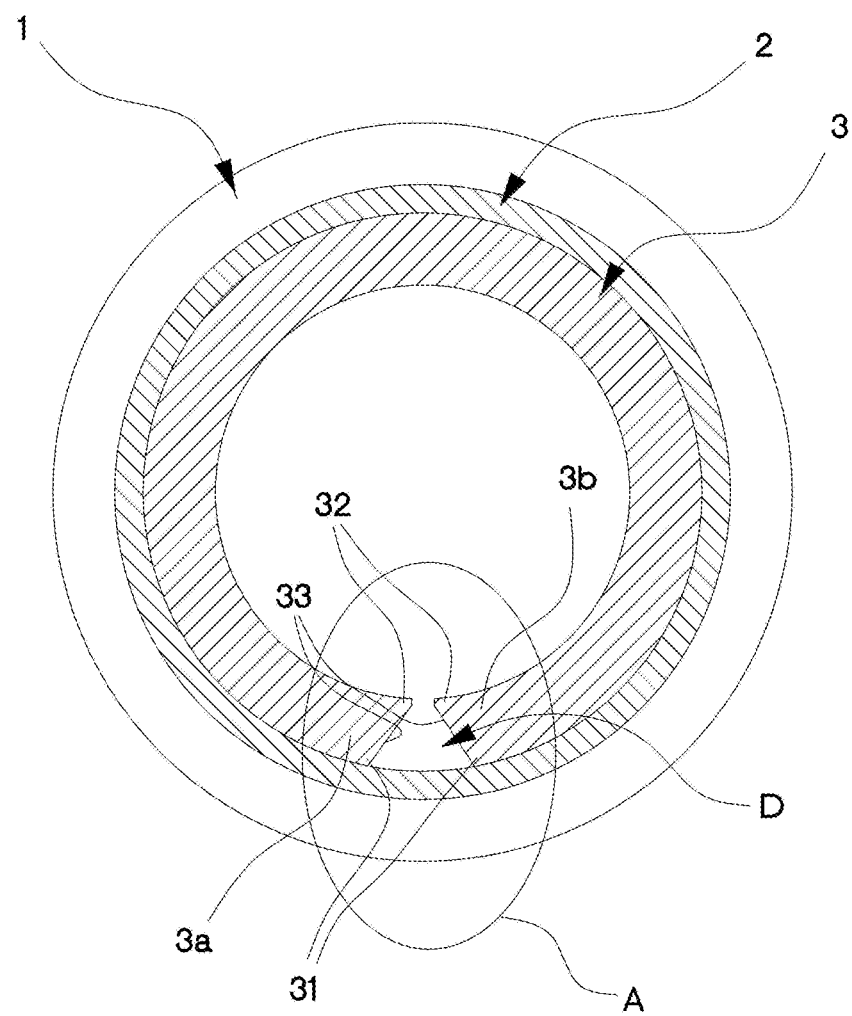
FIG. 2 is a cross-sectional view of a tire in a circumferential direction thereof for illustrating a state in which the sound absorbing material is adhered to an inner liner of the resonance noise reduction tire of the present invention.

The resonance noise reduction tire of the present invention has a technical characteristic that the sound absorbing material 3 mounted in the tire 1 is configured in such a manner that opposite ends 3a and 3b thereof are separated at a predetermined interval D so as not to be abutted to each other, as illustrated in FIG. 2.

The sound absorbing material 3 is adhered to the inner liner 2 using the adhesive, the double-sided tape, or the like in a circumferential direction thereof. In this case, the sound absorbing material 3 adhered to the inner liner 2 in such a manner that the opposite ends 3a and 3b thereof are separated at the predetermined interval D while not being abutted to each other.

Figure 3:
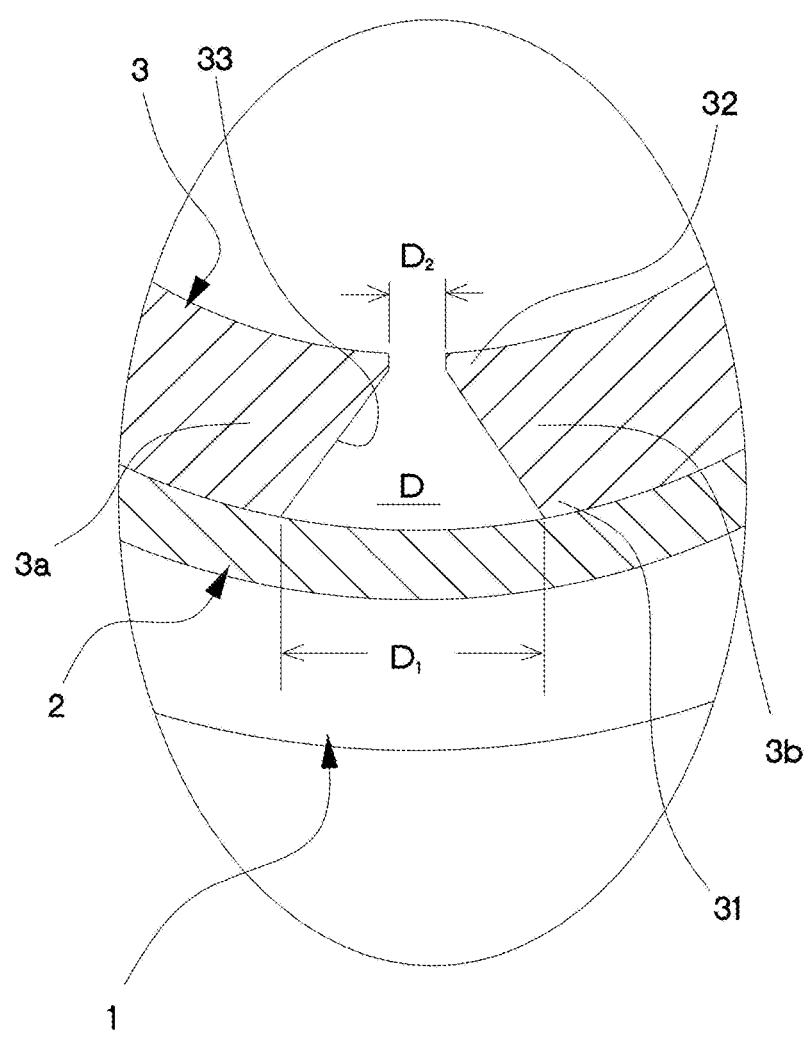
FIG. 3 is an enlarged view of a portion A in FIG. 2.

In addition, as illustrated in FIG. 3, each of the opposite ends 3a and 3b of the sound absorbing material 3 may be classified into an adhered end side 31 which is formed on an outer side in a radial direction of the tire 1 with being adhered to the inner liner 2 and a free end side 32 which is formed on an inner side in the radial direction of the tire 1. The respective adhered end sides 31 and the free end sides 32 are formed at different separated intervals $D_1$ and $D_2$ from each other.

For example, the separated interval $D_1$ of the adhered end side 31 may be widely formed in a range of about 20 to 50 mm, and in this case, the separated interval $D_2$ of the free end side 32 may be narrowly formed in a range of about 10 to 30 mm.

Meanwhile, if the separated interval $D_1$ of the adhered end side 31 is formed to be 50 mm or more, it may be influenced to the uniformity performance of the tire 1 to cause a failure therein, thus it is preferable to be 50 mm or less. In addition, the separated interval $D_2$ of the free end side 32 is formed to be 20 mm or less, a phenomenon, in which the opposite ends of the free end side 32 collide with each other, frequently occurs, thus it is preferable that the separated interval $D_2$ is formed to be 20 mm or more.

In addition, the opposite ends 3a and 3b of the sound absorbing material 3 have inclined faces 33 formed in such a manner that an interval therebetween is gradually increased from the free end side 32 toward the adhered end side 31.

Therefore, the interval D between the opposite ends 3a and 3b is formed so that the separated interval $D_1$ of the adhered end side 31 is larger than the separated interval $D_2$ of the free end side 32 (i.e., $D=D_1>D_2$, see FIG. 3).

Next, an operation of the resonance noise reduction tire of the present invention having the above-described configuration will be described.

When mounting the sound absorbing material 3 in the tire 1 so as to be adhered to the inner liner 2 in the circumferential direction using the adhesive, etc., since the opposite ends 3a and 3b of the sound absorbing material 3 are separated at the predetermined interval D so as not to be abutted to each other, a phenomenon, in which a stress is concentrated at the opposite ends 3a and 3b of the sound absorbing material 3, does not occur. In addition, even if the interval D between the opposite ends 3a and 3b is changed due to a shock applied thereto according to various driving conditions, the opposite ends 3a and 3b of the sound absorbing material 3 on the adhered end side 31 formed at the wide separated interval $D_1$ are definitely not abutted to each other. Further, the opposite ends 3a and 3b of the sound absorbing material 3 on the free end side 32 formed at the narrow separated interval $D_2$ are also not abutted to each other, such that the sound absorbing material 3 is maintained in a state that the respective opposite ends 3a and 3b thereof on the adhered end side 31 are adhered to the inner liner 2 by a strong adhesive force at the time of manufacturing the tire 1.

Further, even if a phenomenon, in which the opposite ends 3a and 3b of the sound absorbing material 3 on the free end side 32 formed at the narrow separated interval $D_2$ are abutted to each other due to a great shock instantaneously applied to the tire 1, occurs, there is no change in the adhesive force of the opposite ends 3a and 3b on the adhered end side 31. Since the above-described phenomenon disappears immediately after it occurs in a moment, the sound absorbing material 3 may be continuously maintained in a state that the opposite ends 3a and 3b thereof are adhered to the inner liner 2 as at the time of manufacturing the tire 1.

Furthermore, since the sound absorbing material 3 is adhered to the inner liner 2 by the strong adhesive force through the opposite ends 3a and 3b thereof, improvement in the uniformity performance of the tire 1 may be enhanced. Due to the sound absorbing material 3, a volume of an inner cavity of the tire 1 may be decreased to reduce the vibration of air, as well as the resonance noise. As a result, effects of improving silence or ride comfort during driving may be obtained.

DESCRIPTION OF REFERENCE NUMERALS

1: tire, 2: inner liner
3: sound absorbing material, 3a, 3b: opposite ends
31: adhered end side, 32: free end side
33: inclined face, D: predetermined interval
$D_1$, $D_2$: separated interval

What is claimed is:

1. A resonance noise reduction tire having a sound absorbing material which is mounted therein using an adhesive so as to be adhered to an inner liner formed inside the tire in a circumferential direction thereof, wherein the sound absorbing material is adhered to the inner liner in the circumferential direction thereof, and the sound absorbing material is configured so that opposite ends thereof are adhered with being separated at a predetermined interval so as not to be abutted to each other, wherein the opposite ends of the sound absorbing material are formed so that a separated interval of an adhered end side which is formed on an outer side in the radial direction of the tire with being adhered to the inner liner is larger than a separated interval of a free end side which is formed on an inner side in a radial direction of the tire, and wherein the opposite ends of the sound absorbing material have inclined faces formed in an inversed V shape so that an interval therebetween is gradually increased from the free end side formed at the narrow separated interval toward the adhered end side formed at the wide separated interval.

2. The resonance noise reduction tire according to claim 1, wherein the sound absorbing material is formed so that the opposite ends thereof on the free end side are separated at an interval of 10 to 30 mm, and the opposite ends thereof on the adhered end side are separated at an interval of 20 to 50 mm.

* * * * *